Feb. 11, 1930.   W. C. READEKER   1,746,607
MOTION PICTURE MACHINE
Filed Oct. 1, 1926   2 Sheets-Sheet 1
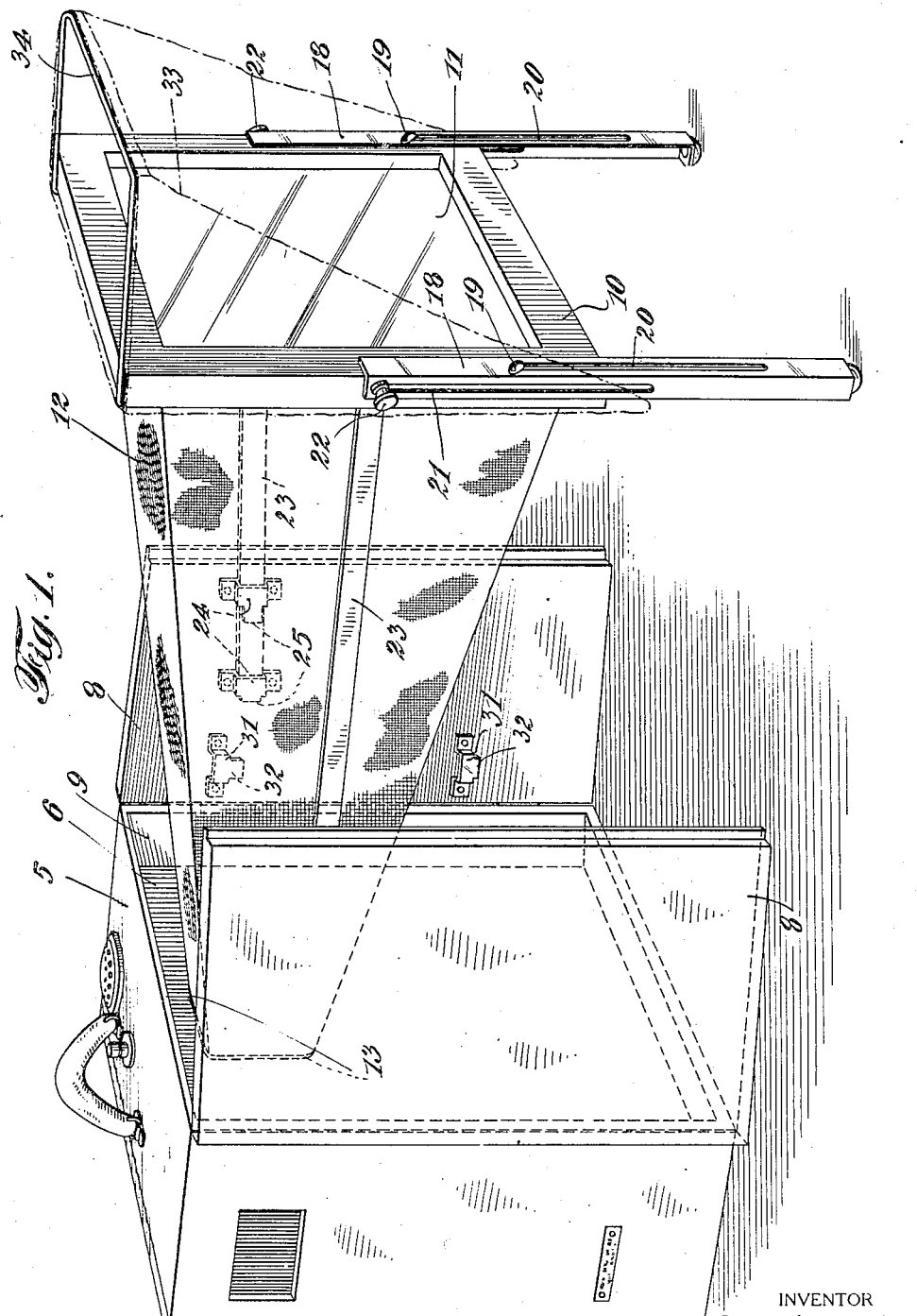
INVENTOR
William C. Readeker
BY C. P. Goepel
his ATTORNEY Feb. 11, 1930.                    W. C. READEKER                    1,746,607
                               MOTION PICTURE MACHINE
                          Filed Oct. 1, 1926        2 Sheets-Sheet 2
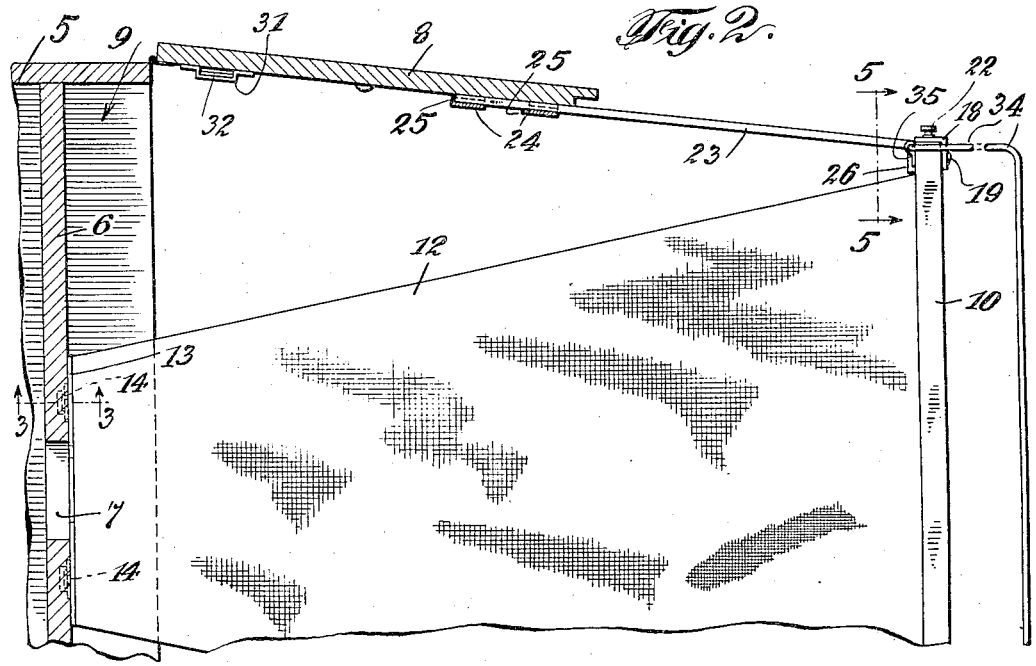
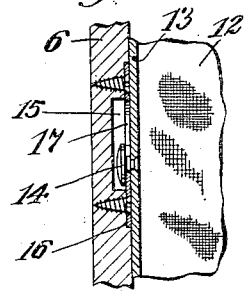 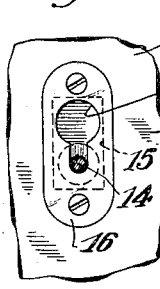 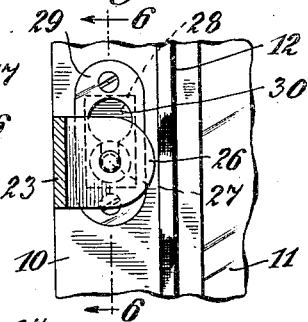 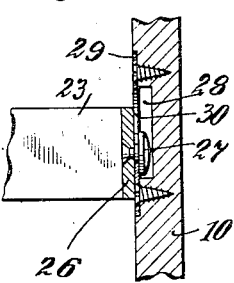
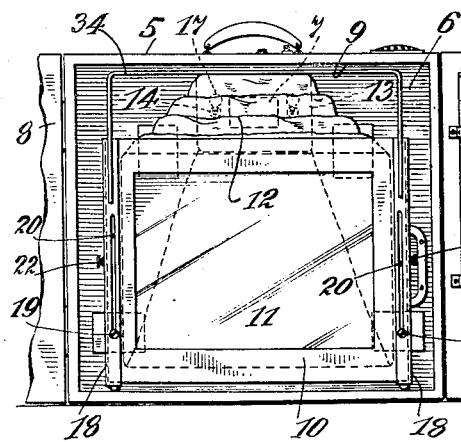
INVENTOR
William C. Readeker
BY C. P. Grefel
his ATTORNEY Patented Feb. 11, 1930

1,746,607

UNITED STATES PATENT OFFICE

WILLIAM C. READEKER, OF NEW YORK, N. Y.

MOTION-PICTURE MACHINE

Application filed October 1, 1926. Serial No. 138,819.

This invention relates to motion picture machines, and more particularly to a portable machine of the continuous film type such as is illustrated and described in patents numbered 1,542,408 and 1,542,409, issued January 16, 1925.

Portable motion picture projectors embodying the essential features of the above named patents are now being generally used for the purpose of advertising various commodities.

It is the primary object and purpose of my present invention to provide an improved rear projection screen for such motion picture cameras together with a flexible hood attached at one of its ends to the rear side of the screen and at its other end to a wall of the camera case around the light opening, and said screen together with the hood adapted to be compactly arranged within the camera case when the machine is not in use.

It is a further object of my invention to provide a novel supporting means adjustably connected with the screen frame whereby the screen may be easily and quickly adjusted with respect to the light opening to properly focus the pictures on the screen.

It is an additional object of my present improvements to provide detachable connecting bars between the hinged doors of the projector case and the screen frame at opposite sides of the hood which further stabilize the screen in its display position, and said doors having suitable means on their inner sides to receive and support said bars when the projector case is closed.

I also provide as another feature of my present invention a detachable canopy to extend forwardly from the screen frame and prevent natural light rays from striking directly upon the screen so that the machine may be effectively used in daytime, said canopy having a wire frame and the screen frame being provided on its rear side with means to detachably receive said frame. This canopy can therefore, be readily detached and closely arranged against one side of the screen when the latter is positioned within the projector case.

With the above and other objects in view, the invention consists in the improved motion picture machine, and in the form, construction and relative arrangement of the several parts as will be hereinafter more fully described, illustrated in the accompanying drawings, and subsequently incorporated in the subjoined claims.

Referring in detail to the drawings wherein I have disclosed one simple and satisfactory embodiment of my present improvements, and in which similar reference characters designate corresponding parts throughout the several views,—

Figure 1 is a perspective view showing a motion picture machine or projector provided with my present invention and set up in condition for use;

Fig. 2 is a fragmentary horizontal sectional view;

Fig. 3 is a detail section taken on the line 3—3 of Fig. 2;

Fig. 4 is an elevation of certain of the parts shown in Fig. 3;

Fig. 5 is a sectional view taken on the line 5—5 of Fig. 2;

Fig. 6 is a section taken on the line 6—6 of Fig. 5, and

Fig. 7 is an elevation showing the screen and connecting hood housed within the projector case.

Since the motion picture projecting mechanism in connection with which my present invention is employed is fully disclosed in the patents above referred to, although this mechanism might be of any other approved construction, it is not herein shown or described in detail, as such mechanism constitutes no essential feature of the present invention. For the purpose of this explanation, it will suffice to state that the film reel, together with the projecting mechanism is entirely contained on enclosed within a carrying case generally indicated at 5 of the requisite proportions. In spaced relation to one of the open sides of the case body, a wall 6 is mounted and suitably secured to the body walls of the case. This wall is provided with the usual light opening 7 through which the pictures are projected upon a suitable screen. This open side of the case is adapted to be closed by the doors 8 suitably hinged to opposite side walls of said case and by positioning the wall 6 in spaced relation to the edges of the body wall of the case, as stated, when said doors are closed, a space indicated at 9 is provided between the inner faces of the doors and the wall 6 and within this space, the screen and other parts adapted to be associated therewith are compactly contained when the apparatus is not in use so that said screen and its associated parts may be conveniently transported or carried with the picture projecting mechanism in the single case 5.

In conjunction with the picture projecting mechanism, a rear projection screen is employed, or in other words, such screen is arranged forwardly or in advance of the light opening 7 so that the pictures are projected upon the rear side of the screen to be viewed from the front thereof. In order that this screen, together with the projector may be set up in a show window for advertising display purposes in a minimum of space, I provide the frame 10 within which a translucent screen 11 is suitably secured. While this frame is of such dimensions that it may be readily contained within the camera case 5, the screen 11 will nevertheless, be of sufficient size which, it will be understood, is limited by the permissible distance to which said screen may be spaced from the light opening 7, to clearly display the pictures on a sufficiently large scale whereby they may be intelligibly observed and understood by persons standing before the show window.

One end of a tubular hood 12 of flexible material is suitably attached to the rear side of the screen frame 10, said hood tapering longitudinally to its smaller end which is attached to the outer edge of a rectangular metal frame plate 13. To this plate and projecting from one side thereof suitably spaced headed studs 14 are riveted or otherwise fixed. The face of the wall 6 surrounding the light opening 7 is recessed as at 15 and metal plates 16 are secured to said wall over the open sides of these recesses. Each of these plates is provided with a keyhole slot 17. Thus, the plate 13 may be readily attached to the wall 6 by inserting the heads of the studs 14 through the larger ends of said slots 17 and then shifting said plate to engage the shanks of said studs in the narrow end portions of the slots. In this position of said plate, the inner edge thereof approximately coincides with the edge of the opening 7 and the plate is closely held against the face of the wall 6.

In order that the frame 10 and screen 11 may be vertically adjusted with respect to the opening 7 to properly focus the pictures on the screen, I provide supporting standards 18 consisting of metal bars of angular form in cross section and of the requisite length, the flanges of which are slidably engaged with the front face and the side edge faces of the screen frame. These standards are permanently connected with the frame by screws 19 threaded into the front side of the frame 10 and engaged through slots 20 in one flange of each supporting standard. The other flange of each standard is also provided with a longitudinal slot 21 therein through which a suitable threaded stud fixed in the frame 10 extends, clamping nuts 22 being engaged upon said studs. By means of these nuts, the supporting standards may be securely clamped to the screen frame in the desired adjusted position with relation thereto so that the screen will be supported at the proper elevation.

In order to rigidly hold the screen in the desired spaced relation from the light aperture 7 and to stabilize the same, I provide two metal bars 23 adapted to be horizontally arranged at opposite sides of the hood 12 with one of their ends engaged in spaced metal brackets or guides 24 which are fixed to the inner faces of each of the doors 8. Each of these brackets on its intermediate portion is provided with a longitudinally projecting spring tongue indicated at 25 to resiliently clamp the metal bar against the face of the door. The other end of each of the bars 23 is angularly bent as at 26 and provided with a headed stud 27. The rear face of each vertical side portion of the screen frame is recessed as at 28, the open side of said recess being covered by the metal plate 29 having a keyhole slot 30 therein to receive the headed stud 27 of one of the bars 23. Thus, the ends of the bars 23 may be easily and quickly detachably connected with the screen frame, said bars providing rigid brace members extending between the frame and the cabinet doors 8. These bars also serve to prevent the casual inward swinging movement of the open doors 8 against the opposite sides of the hood 12.

There is also provided upon the inner face of each door 8 adjacent its hinged edge, additional vertically spaced guide brackets 31 arranged at right angles with respect to the brackets 24, said brackets 31 being likewise provided with projecting spring tongues 32. These latter brackets are adapted to receive the bars 23 and support the same in vertical positions upon the respective doors 8 as indicated in Fig. 7 of the drawings, when the machine is not in use.

In order to permit the machine to be used during the daytime to the best advantage in the display of the pictures, I preferably provide means for protecting the screen 11 against the direct impingement of natural light rays thereon. As herein shown, this means may consist of a canopy 33 preferably of dark velvet or other similar decorative material having an intermediate portion suitably secured to a substantially U-shaped wire frame 34, the side portions of the material being properly cut so that they may be artistically draped at the opposite sides of the screen frame. The ends of the U-shaped wire from 34 are angularly bent for detachable engagement in suitable sleeves or socket members indicated at 35 which are fixed to the rear face of the screen frame 10 at its upper edge. Thus as seen in Fig. 1, said frame 34 will project forwardly at the top of the screen frame so that the canopy 33 will thus shield the screen 11 against the natural light rays and also provide a decorative or artistic embellishment for the screen.

From the foregoing description, it will be seen that when the apparatus is set up in a show window for use in the manner shown in Fig. 1, the screen will be very rigidly and firmly supported for the proper projection of the pictures thereon from the projection machine arranged rearwardly of said screen. The screen is usually positioned comparatively close to the window, and although said screen is necessarily of limited area, the projected pictures will appear sharp-defined thereon and of sufficient size so that the observer will have no difficulty in intelligibly appreciating the advantageous features of the particular commodity which is being advertised.

When the apparatus is to be removed from the window it is only necessary to first detach the side bars 23 from the screen frame and from the brackets 24, and then insert said bars vertically through the holding brackets 31 on the cabinet doors. The nuts 22 are then loosened and the standards 18 move longitudinally on the sides of the screen frame until the lower ends of the standards come into contact with said frame when the nuts 22 are again tightened. After detaching the canopy frame 34 from the screen frame, said screen is then moved inwardly into the space 9 within the case 5, the flexible hood 12 being folded up between said frame and the wall 6. The canopy 33 may then also be positioned in the space 6 against the outer side of the screen frame 10 after which the doors 8 of the case are closed and latched. Thus, the projecting mechanism with the screen and the hood are all contained within the single case 5 which can be easily carried in the manner of the ordinary traveling case from place to place. It will accordingly be seen that my present improvements are particularly advantageous and desirable in the use of the continuous film type of motion picture projector for display advertising and other analogous purposes. The several parts of the invention as herein described are of simple form and construction and may be produced at comparatively small manufacturing cost.

I have herein disclosed an embodiment of my present improvements which has given highly satisfactory service in actual use. Nevertheless, it is to be understood that the essential features of the invention might also be incorporated in various other alternative structural forms, and I therefore, reserve the privilege of resorting to all such legitimate changes in the form, construction and relative arrangement of the several parts as may be fairly incorporated within the spirit and scope of the invention as claimed.

I claim:

1. In combination with a motion picture projector having a case and doors closing one side of the case, said case being provided with a wall inwardly spaced from said doors and having a light aperture, a screen, a tubular hood of flexible material attached at one of its ends to the rear side of the screen and having its other end attached to said wall around the light aperture therein, adjustable supporting standards for said screen to sustain the latter in operative position in advance of said light aperture, rigid brace members, means on the rear side of the frame and on the inner faces of said doors with which the opposite ends of said brace members are adapted to be detachably connected to brace the screen and retain the flexible hood in distended condition, additional means on the inner face of each door to support said brace members when not in use, and said screen supporting standards adapted to be adjusted relative to the screen and moved therewith and with the flexible hood into the space between the doors and said wall of the projector case to be confined therein by the doors when the latter are closed.

2. In combination with a motion picture projector having a case and doors closing one side of the case, said case being provided with a wall inwardly spaced from said doors and having a light aperture, a screen, a tubular hood of flexible material attached at one of its ends to the rear side of the screen and having its other end attached to said wall around the light aperture therein, adjustable supporting standards for said screen to sustain the latter in operative position in advance of said light aperture, rigid brace members, means on the rear side of the frame and on the inner faces of said doors with which the opposite ends of said brace members are adapted to be detachably connected to brace the screen and retain the flexible hood in distended condition, additional means on the inner face of each door to support said brace members when not in use, a canopy, means for detachably connecting said canopy with the top of the screen to extend forwardly therefrom, said screen supporting standards adapted to be adjusted relative to the screen and together therewith and with said flexible hood and said canopy positioned in the space between the doors and said wall of the projector case and confined therein by said doors when the latter are closed.

3. In combination with a motion picture projector case having a wall provided with a light aperture, a projection screen adapted to be arranged in advance of said light aperture, a flexible hood connected at one of its ends to the rear side of said screen, means on the other end of said hood and said wall of the case to detachably connect the latter end of the hood to said wall around the light aperture, supporting standards of angular cross sectional form permanently connected with the screen frame and slidably engaged with the front and edge faces thereof, and means for securing said standards in adjusted position relative to the screen to support the latter in focused relation to the light aperture, said screen, its supporting standards and the hood adapted to be relatively arranged within one side of the projector case.

4. In combination with a motion picture projector case having a side wall provided with a light aperture and doors for closing said side of the case, a screen, a flexible hood attached at one of its ends to the rear side of the screen and having its other end attached to said case wall around the light aperture, supporting standards for the screen, means slidably connecting the standards with the screen and permitting of the vertical adjustment of the screen to focus the same relative to the light aperture, bracing means for the screen, and means on each of said doors and on the screen for the detachable connection of said bracing means therewith to retain the flexible hood in a distended condition and maintain the screen in definitely spaced relation to the light aperture.

5. In combination with a motion picture projector case having a wall provided with a light aperture, a screen, a flexible hood attached at one of its ends to the rear side of the screen and having its other end attached to said case wall around the light aperture, and means for supporting the screen in spaced relation to the light aperture and retaining the flexible hood in distended condition including rigid bracing members, and means on the rear side of the screen and on the projector case for the detachable connection of the ends of said bracing members therewith, said case at one side of the light aperture having a space within which the folded hood, the screen and said bracing members are received when the device is not in use.

In testimony that I claim the foregoing as my invention, I have signed my name hereto.

WILLIAM C. READEKER.